United States Patent
Kallio et al.

(10) Patent No.: US 11,940,812 B2
(45) Date of Patent: Mar. 26, 2024

(54) ZONE PASSAGE CONTROL IN WORKSITE

(71) Applicant: SANDVIK MINING AND CONSTRUCTION OY, Tampere (FI)

(72) Inventors: Janne Kallio, Tampere (FI); Antti Lehtinen, Tampere (FI); Jarkko Ruokojarvi, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 630 days.

(21) Appl. No.: 17/053,338

(22) PCT Filed: May 9, 2018

(86) PCT No.: PCT/EP2018/061951
§ 371 (c)(1),
(2) Date: Nov. 5, 2020

(87) PCT Pub. No.: WO2019/214817
PCT Pub. Date: Nov. 14, 2019

(65) Prior Publication Data
US 2021/0263534 A1    Aug. 26, 2021

(51) Int. Cl.
*G05D 1/02* (2020.01)
*E02F 9/20* (2006.01)
(Continued)

(52) U.S. Cl.
CPC ........... *G05D 1/0289* (2013.01); *E02F 9/205* (2013.01); *E02F 9/2054* (2013.01);
(Continued)

(58) Field of Classification Search
CPC ...... G05D 1/0289; G05D 1/0088; G05D 1/02; G05D 2201/021; G05D 2201/0216;
(Continued)

(56) References Cited

U.S. PATENT DOCUMENTS

| | | | |
|---|---|---|---|
| 6,134,496 A | 10/2000 | Kaneko | |
| 2012/0053703 A1* | 3/2012 | Nettleton | E21C 41/26 700/9 |

(Continued)

FOREIGN PATENT DOCUMENTS

| | | |
|---|---|---|
| CL | 202002830 | 4/2021 |
| EP | 3040508 A1 | 7/2016 |

(Continued)

*Primary Examiner* — Michael J Zanelli
(74) *Attorney, Agent, or Firm* — Corinne R. Gorski

(57) ABSTRACT

A method for a zone passage control system for an underground worksite having a plurality of operation zones for autonomously operating mobile vehicle operations includes the steps of associating a first passage control unit with a first zone and a second zone, detecting state parameter information of the first zone and the second zone, merging the first zone and the second zone into a fusion zone on the basis of the state parameter information of the first zone and the second zone, and adapting the zone passage control system to allow a first autonomously operating mobile vehicle to pass the first passage control unit in the fusion zone without interrupting operation of a second autonomously operating mobile vehicle in the first zone and/or the second zone.

15 Claims, 4 Drawing Sheets

(51) Int. Cl.
*G05D 1/00* (2006.01)
*G08G 1/01* (2006.01)
(52) U.S. Cl.
CPC ........... *G05D 1/0088* (2013.01); *G08G 1/012* (2013.01); *G05D 2201/021* (2013.01)
(58) Field of Classification Search
CPC ........ E02F 9/205; E02F 9/2054; G08G 1/012; G08G 1/09
See application file for complete search history.

(56) References Cited

U.S. PATENT DOCUMENTS

| | | | | |
|---|---|---|---|---|
| 2012/0053775 | A1* | 3/2012 | Nettleton | G06Q 10/06 |
| | | | | 701/24 |
| 2016/0062345 | A1* | 3/2016 | Stubbs | B25J 5/00 |
| | | | | 701/2 |
| 2017/0144307 | A1 | 5/2017 | Rublee et al. | |

FOREIGN PATENT DOCUMENTS

| | | |
|---|---|---|
| WO | WO 2011/051558 A3 * | 5/2011 |
| WO | 2019214817 A1 | 11/2019 |

* cited by examiner

| Zone | State | 2a | 2b | 2c | 2d | 2e | 2f |
|------|-------|----|----|----|----|----|----|
| 4a | M | x | x | | | | |
| 4b | A | | x | x | | | |
| 4c | A | | | x | x | | |
| 4d | M | | | | | x | |
| 4e | M | | | | | | |
| 4f | M | x | | | | | |
| | Class | B | B | I | B | B | B |

# ZONE PASSAGE CONTROL IN WORKSITE

RELATED APPLICATION DATA

This application is a § 371 National Stage Application of PCT International Application No. PCT/EP2018/061951 filed May 9, 2018.

FIELD

The present invention relates to zone passage control in an underground worksite.

BACKGROUND

Underground worksites, such as hard rock or soft rock mines, typically comprise a variety of operation zones intended to be accessed by different types of mobile work machines, herein referred to as mobile vehicles. An underground mobile vehicle may be an unmanned, e.g. remotely controlled from a control room, or a manned mobile vehicle, i.e. operated by an operator sitting in a cabin of the mobile vehicle. Mobile vehicles operating in underground work sites may be autonomously operating, i.e. automated mobile vehicles, which in their normal operating mode operate independently without external control but which may be taken under external control at certain operation areas or conditions, such as during states of emergencies.

An isolated operation zone is typically reserved in mines for the operation of the automated mobile vehicles, into which zone an access by outsiders and outside vehicles is prevented in order to eliminate any risk of collision. The operation zone being provided with this kind of limited access may be separated from other zones in the mine by gates or other kind of passage control devices. However, in order to provide an effective operation of the mine, access may need to be provided also for persons or outside mobile vehicles into the operation zone being originally reserved only for the operation of the automated mobile vehicles.

EP3040508 discloses a system for zone passage control for a zone of an autonomously operating mobile object, comprising in set of detection units to detect a mobile object entering and/or exiting the zone, a set of identification units to identify the mobile object entering and/or exiting the zone. An admissibility level for a mobile object to enter the zone is determined and a control signal to stop at least one autonomously operating mobile object existing in the zone is provided in response to the determined admissibility level being negative for the mobile object entered the zone.

SUMMARY

According to a first aspect of the present invention, there is provided an apparatus for zone passage control in an underground worksite comprising a plurality of operation zones for autonomously operating mobile vehicle operations, the apparatus comprising: means for associating a first passage control unit with a first zone and a second zone, means for detecting state parameter information of the first zone and the second zone, means for merging the first zone and the second zone into a fusion zone on the basis of the state parameter information of the first zone and the second zone, and means for adapting the zone passage control system to allow a first autonomously operating mobile vehicle to pass the first passage control unit in the fusion zone without interrupting operation of a second autonomously operating mobile vehicle in the first zone and/or the second zone.

According to a second aspect of the present invention, there is provided a method for a zone passage control system for an underground worksite comprising a plurality of operation zones for autonomously operating mobile vehicle operations, comprising: associating a first passage control unit with a first zone and a second zone, detecting state parameter information of the first zone and the second zone, merging the first zone and the second zone into a fusion zone on the basis of the state parameter information of the first zone and the second zone, and adapting the zone passage control system to allow a first autonomously operating mobile vehicle to pass the first passage control unit in the fusion zone without interrupting operation of a second autonomously operating mobile vehicle in the first zone and/or the second zone.

According to a third aspect, there is provided an apparatus comprising at least one processing core, at least one memory including computer program code, the at least one memory and the computer program code being configured to, with the at least one processing core, cause the apparatus at least to carry out the method or an embodiment of the method.

According to a fourth aspect, there is provided a computer program product, a computer readable medium, or a non-transitory computer readable medium comprising program instructions for causing an apparatus to at least perform: associate a first passage control unit with a first zone and a second zone, detect state parameter information of the first zone and the second zone, merge the first zone and the second zone into a fusion zone on the basis of the state parameter information of the first zone and the second zone, and adapt the zone passage control system to allow a first autonomously operating mobile vehicle to pass the first passage control unit in the fusion zone without interrupting operation of a second autonomously operating mobile vehicle in the first zone and/or the second zone.

According to an embodiment, a control command to stop the second autonomously operating mobile vehicle in the first zone and/or the second zone is prevented in response to the first autonomous mobile vehicle being detected by the first passage control unit set into the passive state.

EMBODIMENTS

The term underground worksite herein is intended to include a variety of underground worksites, including for example different kinds of underground excavation worksites, such as mines, roadwork sites, and railroad worksites. The term mobile object in this specification and claims is intended to include all mobile objects which may have an access into an operation zone of a worksite, such as mobile vehicles and human beings being at work in the worksite. The term mobile vehicle herein refers generally to mobile work machines suitable to be used in the operation of different kinds of underground mining or construction excavation worksites, such as lorries, caterpillars, dumpers, vans, mobile rock drilling or milling rigs, mobile reinforcement machines, and bucket loaders or other kind of mobile work machines which may be used in different kinds of excavation worksites. The term autonomously operating mobile vehicle herein refers to automated or semi-automated mobile vehicles, which in their autonomous operating mode may operate independently without requiring continuous user control but which may be taken under external control during states of emergencies, for example.

Figure 1:
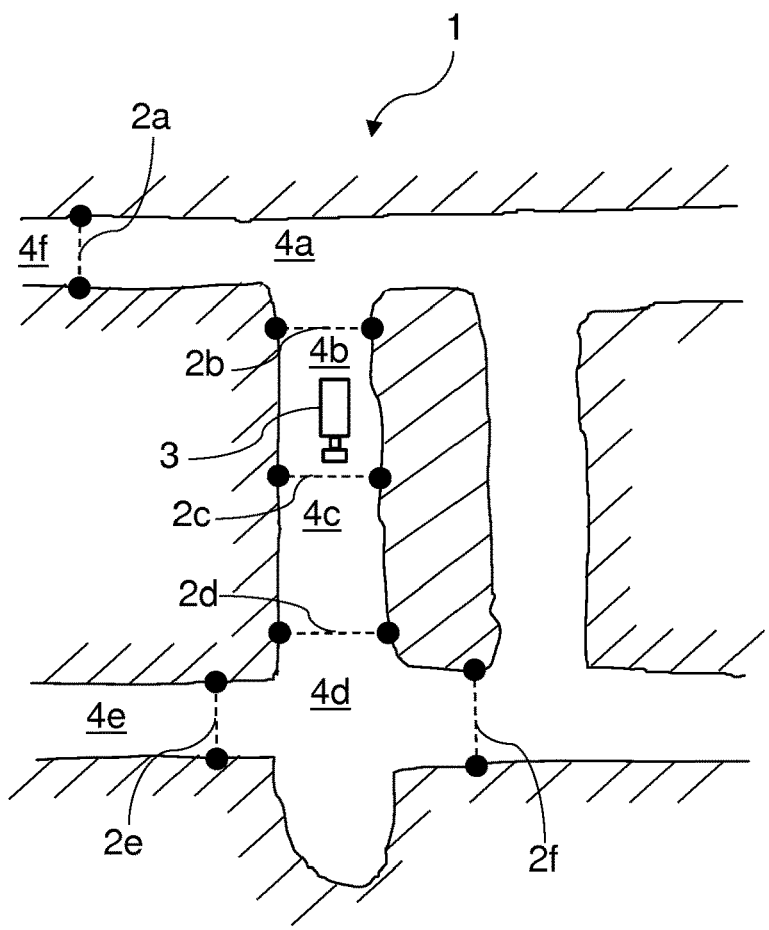
FIG. 1 illustrates an example of an underground work site provided with a system for zone passage control.

FIG. 1 illustrates an example of an underground work site 1 provided with a system for zone passage control in tunnels of the work site. The system comprises passage control units (PCU) 2a, 2b, 2c, 2d, 2e, 2f separating operation zones 4a, 4b, 4c, 4d, 4e, and 4f. For example, PCU 2b is associated with zones 4a and 4b, wherein in the zone 4b there may be an autonomously operating mobile vehicle 3. Below a reference sign 4 may be used as a general reference sign for operation zone(s) 4a, 4b, 4c, 4d, 4e, and 4f unless a particular operation zone 4a, 4b, 4c, 4d, 4e, and 4f is referred to. Similarly, PCU may be used as a general reference sign for passage control unit(s) 2a, 2b, 2c, 2d, 2e, 2f, unless a particular passage control unit is referred to.

The passage control system and associated PCUs may be configured to allow movement of one or more mobile vehicles between zones 4. For example, the mobile vehicle 3 may be configured to autonomously travel a route in zones 4b, 4c, and 4d, wherein zone 4d may comprise a dump point at the end of the tunnel. It is to be appreciated that besides the entities illustrated in simplified FIG. 1, there may be further units, sub-systems or elements, such as a specific passage station as described in EP 1616077.

Figure 2:
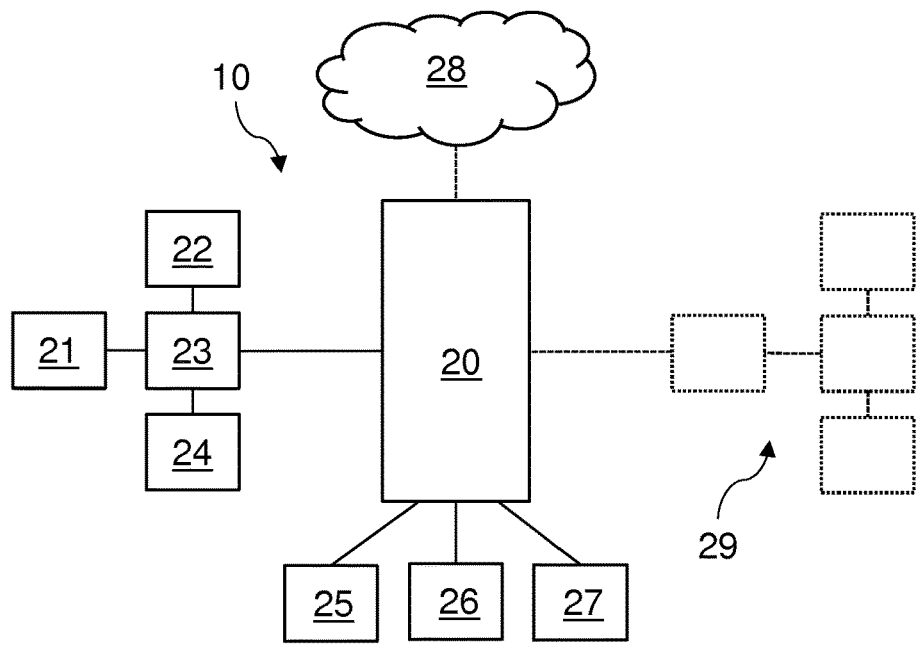
FIG. 2 illustrates a zone passage control system.

FIG. 2 illustrates a system 10 for a zone passage control. The system comprises a number of functional units 21 to 27 and at least one controller 20 being arranged in operational connection with at least some of the functional units 21 to 27.

The zone passage control system may comprise detection units 21 which may be considered as functional units in the system 10 and configured to detect mobile objects to enter a new zone 4. The detection unit 21 may be comprised by the PCU and it is able to detect a mobile object, such as a mobile mining vehicle or a person, entering into the operation zone 4 and/or exiting the operation zone 4.

Detection of a mobile object by a passage control unit, such as a light curtain, refers generally to detecting that the mobile object in close proximity to the PCU. The feature of the mobile object being detected by the PCU or associated detection unit (to enter a new zone) may thus comprise at least one of the following events: a) the mobile object is moving close to the PCU and intending to enter into the zone; b) the mobile object holds still close to the PCU and is waiting to enter into the zone; c) the mobile object has actually already passed the PCU and entered into the zone. The stage of the detection may depend on the applied technology and/or configuration of the detection unit.

When the detection unit 21 detects a mobile object, the detection unit may provide a corresponding signal to the controller 20. The detection unit 21 may be an optoelectronic guard detector, such as a guard detector based on the use a light curtain or photocells. Alternatively other kind of devices such as laser scanning devices and safety mats, for instance, or any other applicable device to detect a presence of the mobile object. The detection unit 21 may be configured to detect the direction of motion of the mobile object and may also provide the direction information to the controller 20.

The system may further comprise identification units 22. The identification unit 22 may be comprised by the PCU and may be configured to identify the mobile object entering or exiting the zone. The identification of the mobile objects may include the identification of the type of the mobile object, in some embodiments if the mobile object is an automated mobile vehicle, an unmanned remotely controllable mobile vehicle or a manned mining vehicle, or a human being. The identification of the mobile object may also include also the identification of a particular vehicle person. When the identification unit 22 has identified the mobile object, the identification unit 22 provides a signal comprising associated identification information to the controller 20.

The identification unit 22 may for example be a reader device or a camera, by which it can be read an identification element 18 comprised by the mobile object. According to an embodiment the identification unit 22 may be a RFID scanner being able to read an RFID tag in the mobile object, the RFID tag thus providing a kind of an identification element 25 comprised by a mobile object, such as the autonomously operating mobile vehicle 3 or a person carrying an identification element. The identification unit 22 may also be a device which is able to identify the mobile object without any counterpart identification element 25 in the mobile object. The identification unit 22 may for example be a device that provides a connection with a control unit of the mining vehicle and receives an identifier from the mining vehicle via a wireless local area network, for example. In an alternative embodiment, the identification unit 22 provides identification information, such as an image of the mobile object, for the controller 20 (or a further signal processing unit/system, such as a neural network) performing the identification of the mobile object. If applicable, the operations provided by the detection unit 21 and the identification unit 22 may also be combined in one single unit.

The system 10 for the zone passage control may comprise indication units 24. The indication unit 24 may be comprised by the PCU and may be configured to indicate an admissibility level and/or further control information for the mobile object to enter into an associated operation zone 4 and/or exit away from the operation zone 4.

For simplicity, only one set of functional units 21, 22, 23, 24 for the PCU is illustrated, but it will be appreciated that the system will comprise a plurality of further sets 29. Depending on the embodiment the system 10 for the zone passage control may comprise only some types of the functional units disclosed above, such as the detection units 21 and the identification units 22, or the detection units 21 and indication units 24. In addition to the functional units mentioned above the system 10 for the zone passage control may comprise further functional units and/or be connected to further units, systems, and/or networks.

In addition to the functional units disclosed above, the system 13 for the zone passage control may comprise transceiver units 23. The transceiver units 23 may be configured to provide a communication link between the functional units disclosed above and the controller 20. Depending on the intended operation of the functional unit the communication link may be established as unidirectional or bidirectional communication link. In the example of FIG. 2 there is a transceiver unit 23 for each PCU and set comprising one or more of a detection unit 21, an identification unit 22, and an indication unit 24. However, if applicable, a transceiver unit 23 may also be provided to serve communication between the controller 20 and several detection units 21, several identification units 22 and several indication units 23. Wireless and/or wired transmission technique may be applied. In some embodiment wireless local area networking, such as IEEE 802.11 or 802.16 based communications is applied.

Any transceiver unit 23 may also be omitted if the respective functional unit(s), i.e. detection units 21, identification units 22 and/or indication units 23 comprise an internal transceiver unit. Furthermore, the central controller 19 may bypass any of the transceiver units 17 and provide a straight communication link with any detection unit 14, any identification unit 22 and any indication unit 16 if applicable.

The system may comprise or be connected to a mobile vehicle control unit 26. The control unit 26 may be provided in each autonomously operating mobile vehicle 3 and be configured to control at least some autonomous operations of the mobile vehicle. In response to detecting a mobile object to enter a zone comprising an autonomously operating mobile vehicle 3, the controller 20 may be configured to send a control command to stop the vehicle 3.

The system 10 and the controller 20 may further be connected to a further system or network 28, such as a worksite management system, a cloud service, an intermediate communications network, such as the internet, etc. The system 10 may further comprise or be connected to a further device or control unit 27, such as a handheld user unit, a vehicle unit, a worksite management device/system, a remote control and/or monitoring device/system, data analytics device/system, sensor system/device, etc.

The controller 20 may comprise one or more processors executing computer program code stored in a memory, and it may comprise or be connected to a user interface with a display device as well as operator input interface for receiving operator commands and information to the controller.

The controller 20 may be configured to control a plurality of operation zones 4, such as zones reserved and configured for the operation of the autonomously operating mobile vehicles, by the detection units 21, the identification units 22 and the indication units 24. In an alternative embodiment, the controller 20 is configured to control only a single operation zone. The controller 20 may be configured to send and receive passage control related information to/from other controllers, or there may be a further master control unit configured to control the controllers 20.

State parameter information may be stored and updated for each zone 4. The state parameter(s) of a zone 4 indicate operational condition or mode of activities allowed in the zone. In some embodiments, the state parameter may indicate autonomous operation, whereby one or more autonomously operating vehicles are allowed to operate in the zone, with or without monitoring by an operator, and persons (or other mobile objects) cannot enter the zone. In some embodiments, the state parameter may indicate manual operation, whereby autonomous operation is not allowed in the zone and persons and manually operated mobile vehicles can enter the zone. However, it is to be appreciated that there may be other states, such as an emergency state.

The state parameter may be changed in response to manual input by an authorized operator or safety responsible person and/or in response to an automatically performed state (definition) procedure checking or detecting one or more state parameter change conditions. A state parameter of at least one zone may be updated in response to detecting a mobile object to pass a passage control unit associated with the at least one zone. In some embodiments, positions of mobile objects are continuously monitored and change of a mobile object from one zone to another triggers the state procedure.

According to an embodiment, the controller 20 is configured to determine the state of the zone 4 on the basis of information supplied by at least one of the detection unit(s) 21, the identification unit(s) 22, and an operator input directly via a user interface to the controller 20 or indirectly via another unit 27, such as a wireless operator unit. The system may further store information about at least one of a number and/or a type of mobile objects existing in the zone 4 and a number and/or a type of mobile objects entering or exiting the zone.

Further, the controller 20 may be configured to determine, on the basis of the determined state of the zone, an admissibility level for a mobile object to enter the zone 4. The controller 20 may also be configured to determine, on the basis of the determined state of the zone, an admissibility level for a mobile object to exit the zone. For example, the controller 20 may be configured to perform at least some zone passage control features on the basis of admissibility level as illustrated in EP 3040508.

However, it is to be appreciated that in an alternative embodiment, at least some of the presently disclosed functions for the controller 20 may, instead of centralized approach, be arranged as decentralized, in a distributed system, such as a system based on a blockchain-based or other type of distribute network. Furthermore, it is to be appreciated that at least some of the disclosed units/devices may be Internet of Things (IoT) devices.

There is now provided an improved passage control system in which operations zones in autonomous operation state may be merged into fusion zones, enabling to improve autonomous operations efficiency.

Figure 3A:
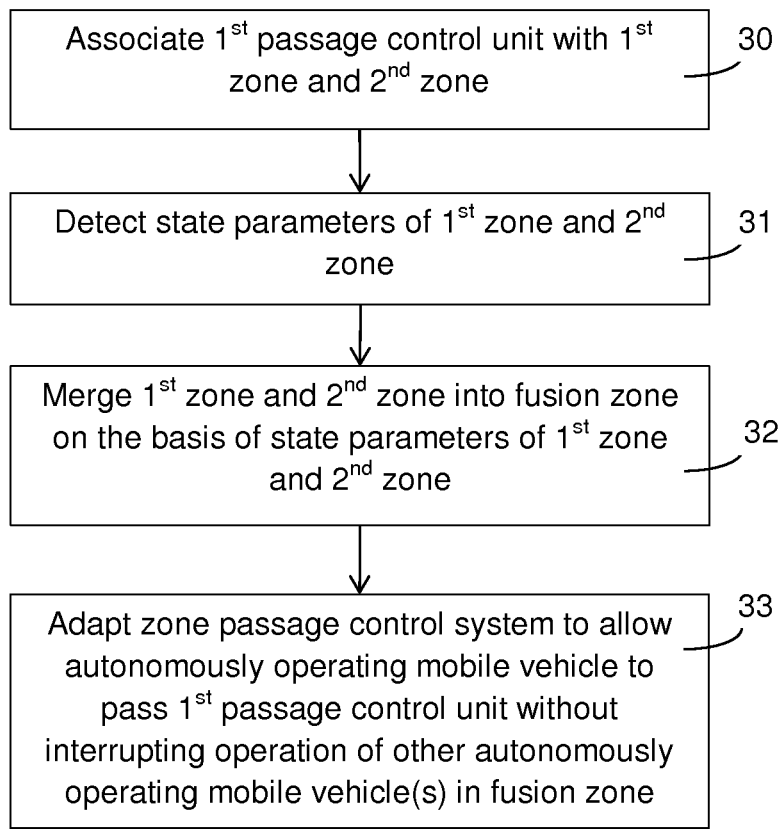
FIGS. 3a and 3b illustrate methods according to at least some embodiments of the present invention.

FIG. 3a illustrates a method for zone passage control in an underground worksite. The method may be implemented in at least one device of a zone passage control system, such as the controller 20.

A first PCU is associated 30 with a first zone and a second zone. Association of a PCU 4 with a zone refers generally to configuring the passage control system to have the particular PCU 4 to operate as a passage control unit for the zone. Block 30 may be entered upon installing PCUs or changing configuration of PCUs, for example. State parameter information of the first zone and the second zone is detected 31. The first zone and the second zone are merged 32 into a single fusion zone on the basis of the state parameter information of the first zone and the second zone.

Block 33 comprises adapting the zone passage control system to allow a first autonomously operating mobile vehicle to pass the first passage control unit in the fusion zone without interrupting operation of a second autonomously operating mobile vehicle in the first zone and/or the second zone. The adaptation may be carried out in the apparatus controlling provision of control to autonomously operating mobile vehicles in the fusion zone, such as the controller 20 carrying out the method of FIG. 3a, and/or in the first PCU.

Figure 3B:
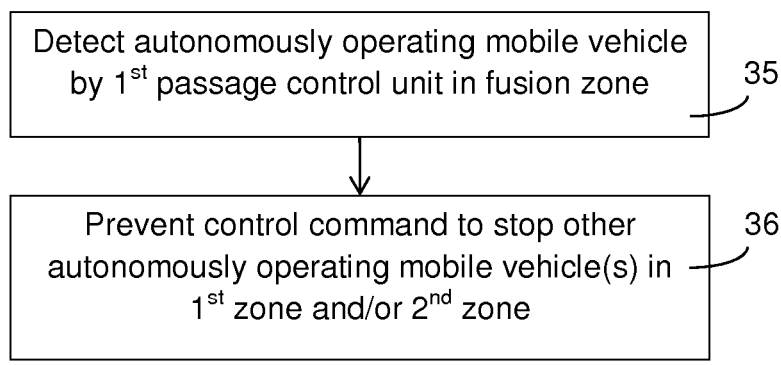

FIG. 3b illustrates an embodiment, which may be applied after block 33. Later, an autonomously operating mobile vehicle may be detected 35 by the first PCU associated with the fusion zone. For example, block 35 may be entered in response to receiving a signal indicative of the mobile vehicle detection from a detection unit 21. A control command to stop other autonomously operating mobile vehicle(s) in the first zone and/or the second zone, i.e. within the fusion zone, is prevented 36. The prevention of the control command is to be understood broadly to refer to not controlling the at least one autonomously operating mobile vehicle in the fusion zone to stop (whereas the vehicle would have been controlled to stop if the first and second zones would not have been merged as the fusion zone).

In this embodiment, the 1$^{st}$ PCU continues to be operative to detect passing mobile vehicles, but the controller 20 may be configured in block 33 to prevent the transmission in response to the set passive state for the PCU. Hence, no configuration or change of state is required in the PCU, but it may continue to operate as before the zone merger 32.

In an embodiment a continuous security or 'lifeline' signal needs to be transmitted to an autonomously operating mobile vehicle to allow the vehicle to operate. In such embodiments, the (sending of) the control command may thus be provided by active stopping of sending the continuous signal, and prevention of the control command may refer to continuing sending the security signal despite of the detection 35.

In another embodiment, the first PCU is deactivated in connection with block 33. It does not detect (35) passing mobile vehicles when in the fusion zone, and may be even switched off. In a still further example embodiment, a specific state, which may be referred to e.g. as a passive or inactive state is set for the first PCU in the fusion zone in block 33. Such state may be e.g. a specific classification parameter as further illustrated later.

The term fusion zone is to be understood broadly to refer to an operational combination of two or more zones associated with the same operational state, such as autonomous operation or manual operation. The operational combination may involve at least the adaptation 33 and a specific state or other identification may be stored in the passage control system for the fusion zone. The fusion zone may be dynamically adapted in response to change in state parameter of one or more of the zones of the fusion zone and their neighboring zones, e.g. on the basis of locations and/or types of mobile objects in one or more of these zones. In some embodiments, the first zone and the second zone are merged in response to the first zone and the second zone being assigned a state parameter indicating autonomous operation.

A further second PCU may be associated with a third zone and the first zone or the second zone. In response to detecting the mobile object by the second PCU, a control command may be transmitted to stop at least one autonomously operating mobile vehicle in the first zone and/or the second zone. The third zone may be a manual operation zone, and appropriate security control action may be instantly undertaken when a person or vehicle from such manual operation mode is detected by the second PCU in the edge of the fusion zone.

A fourth zone may be associated with a third PCU and with the first zone or the second zone. Upon detecting a state change of the fourth zone, the fourth zone may also merged into the fusion zone, in response to the fourth zone being assigned a state parameter indicating autonomous operation. The passive state may thus be set for the third PCU and the fusion zone dynamically further enlarged. In some embodiments, a control command to stop at least one autonomously operating mobile vehicle in the first zone, the second zone, and/or the fourth zone may thus be prevented in response to an autonomously operating mobile vehicle being detected by the third PCU associated with the fusion zone.

Figure 4A:
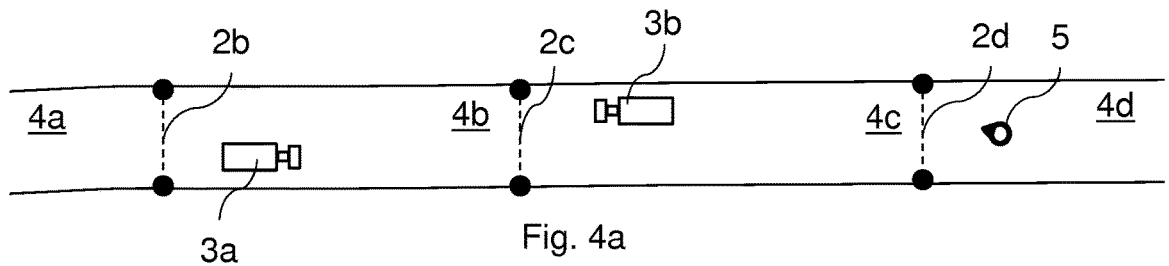
FIGS. 4a to 4d illustrate examples for merging operation zones and operating in fusion zones.
Figure 4B:
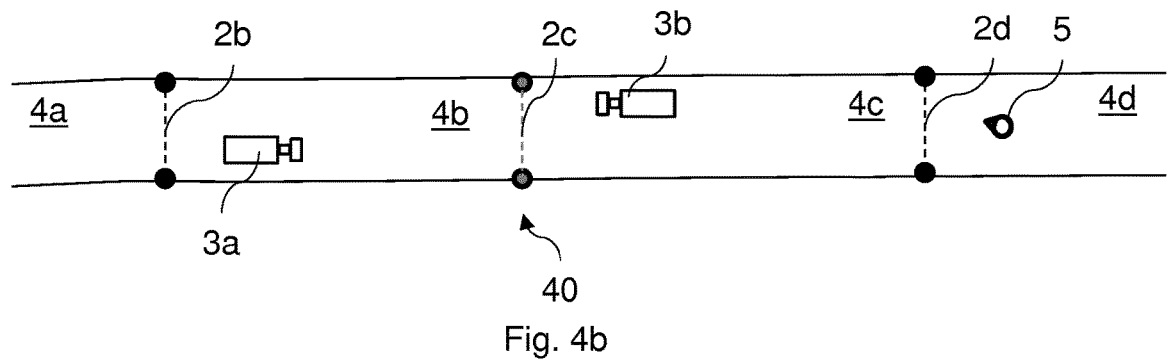

FIGS. 4a to d illustrate examples of merging operation zones and operating in fusion zones. In FIG. 4a, autonomously operating mobile vehicles 3a and 3b have entered in their respective zones 4b and 4c and the zones 4b and 4c may be set in autonomous operation state. The zones 4b and 4c may then be merged to form a fusion zone 40, as illustrated in FIG. 4b.

Figure 4C:
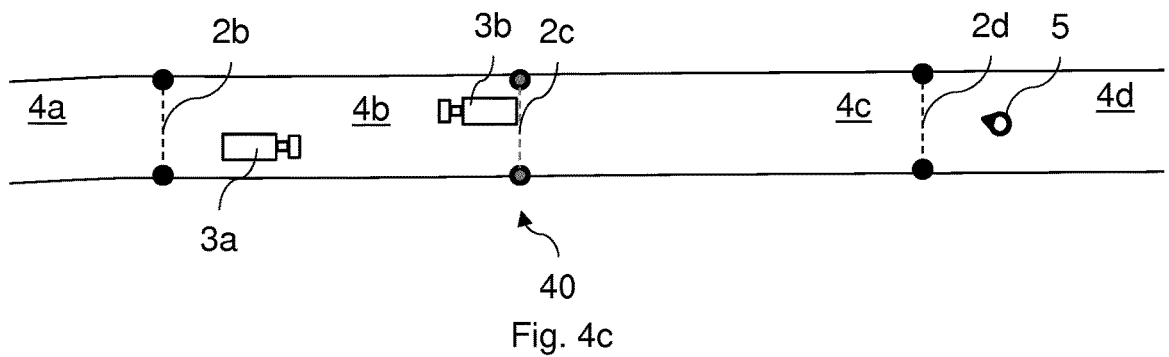

FIG. 4c illustrates a situation where the mobile vehicle 3b has passed the PCU 2c. Since the PCU 2c is associated with zones 4b, 4c belonging to or used as basis of the fusion zone 40, and is thus a part of or included in the fusion zone 40, control command to stop the other mobile vehicle 3a is not sent due to detection of the mobile vehicle 3b by the PCU 2c.

Hence, autonomous operations may continue in the fusion zone uninterrupted. It will be appreciated that the autonomously operating mobile vehicles 3a and 3b may be provided with collision avoidance systems. Alternatively, the system 10, such as the controller 20, or further traffic control system, may be configured with collision avoidance functionality controlling the vehicles based on received position information of the vehicles 3a, 3b.

Figure 4D:
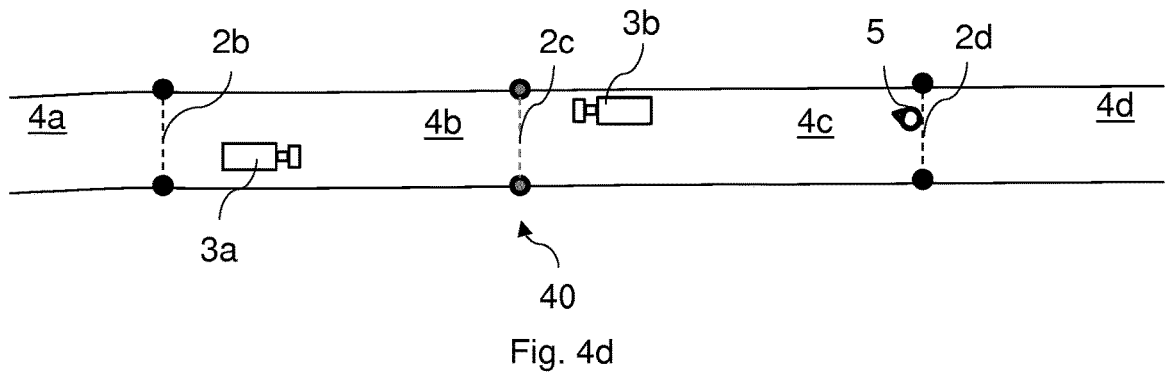

FIG. 4d illustrates a further example situation in which a mobile object 5 approaches or has already entered the fusion zone 40 and is detected by the PCU 2d. Hence, in response to the detection by the PCU 2d, a control command is transmitted at least to the mobile vehicle 3b. In some embodiments the positions of the mobile vehicles within the fusion zone 40 are not monitored, in which case the control command is transmitted also to the mobile vehicle 3a.

In some embodiments, at least one PCU identifier is stored for each zone in a passage control configuration data (record) in connection with configuration of the passage control units. Thus, the first PCU may be associated 30 with the first and second zones on the basis of or by assigning an identifier of the first PCU for the first zone and the second zone.

Figures 5, 6:
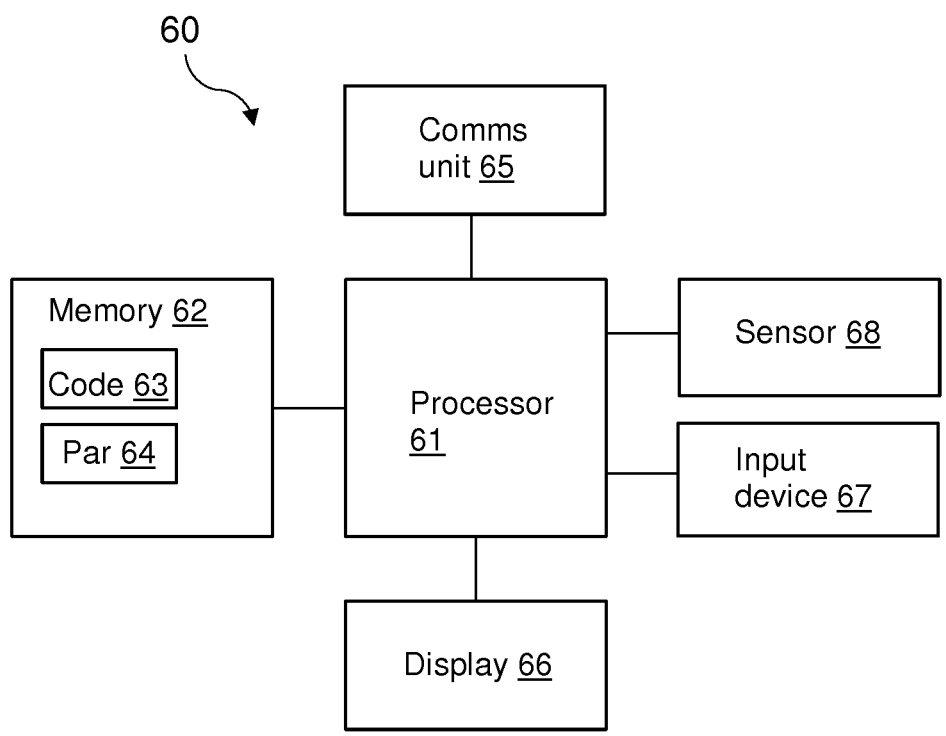
FIG. 5 illustrates an example of zone and passage control unit configuration data record.
FIG. 6 illustrate an apparatus capable of supporting at least some embodiments of the present invention.

Reference is made to FIG. 5 illustrating a simplified example of zone and PCU configuration data record. Each zone 4a to 4f is assigned state parameter information and at least one PCU 2a to 2f. In this example, M refers to manual operation state and A to autonomous operation state. It will be appreciated that the information may be stored in various other ways, for example specific PCU identifiers are stored for each zone or specific zone identifiers are stored for each PCU.

The passage control system, such as the controller 20, may be configured to carry out a routine in which PCU identifiers assigned to at least some of the zones 4 are compared. In response to detecting the same PCU identifier being assigned for the first PCU for the first zone and the second zone, the state parameters of the first zone and the second zone are compared for determining if the first zone and the second zone will be merged 32.

The PCU identifiers and/or the zone state parameters may be detected and compared in response to detecting a mobile object, in response to detecting a change of a state of the first zone and/or the second zone, and/or in response to another trigger, such as periodically caused check or an operator input. For example, since the zone 4b is assigned with the same PCU identifier as the zone 4c, and they are both set on autonomous operations state, they may be merged. Although zones 4c and 4d are associated with the same PCU 2d, they are not merged since the zone 4d is set in the manual operation mode.

In some embodiments, a classification parameter may be assigned for at least some of the PCUs to classify state and/or operational position of the respective PCUs. In some embodiments, the classification parameter defines each PCU as a border PCU or as an intermediate PCU, in the example of FIG. 5 B and I, respectively. The classification border PCU indicates that the associated PCU is currently an end point or border of the fusion zone in the dynamically adaptable zone system. The classification intermediate PCU indicates that the associated PCU is currently an inner PCU and inside of the fusion zone in the dynamically adaptable zone system.

The classification parameter of a PCU may be checked in response to detecting a mobile object by the PCU. The need to generate a control signal to at least one autonomously operating mobile vehicle in a zone associated with the PCU may be determined on the basis of the classification parameter of the PCU. Hence, features illustrated above in connection with blocks 31 and 32 may be repeated each time a state parameter information associated with at least one zone changes. The fusion zone may thus be dynamically increased in response to new zones enabling autonomous operation, and interruptions due to PCU detecting autonomously operating mobile vehicles in the fusion zone may be further reduced.

For example, in connection with the methods of FIGS. 3a and 3b, the classification parameter may be assigned or updated for the first PCU in block 32 or 33. The classification parameter may be checked in response to block 35, and block 36 may be entered in response to the classification parameter indicating the first PCU to be an intermediate PCU. In this embodiment, the fusion zone may be defined by appropriately setting the classification parameters of the respective PCUs. In an alternative embodiment, a specific fusion zone indication may be stored in the system in the respective zone's state parameter information. However, it is to be appreciated that there are also further available options for arranging and storing the indication of the fusion zone in the passage control system.

Continuing with the example of FIGS. 4a to 4d, the PCU 2d may be assigned with the border PCU classification parameter B in response to the zone 4d being assigned a state parameter indicating manual operation. The classification parameter of the PCU 2c may be updated as an intermediate PCU in response to merging of the zones 4b and 4c.

It will be appreciated that the above examples represent only some simplified scenarios and that the present features facilitate dynamic adaptation of the passage control system to changing zone conditions. Various advantages are available on the basis of the presently disclosed features. A dynamically adaptable passage control system is enabled for underground work sites, enabling to avoid manually setting each PCU locally and minimizing interruptions for work vehicles in autonomous operating mode. The size of the automation area may be changed without interrupting operation of autonomously operating mobile vehicles in the automation area. The number of vehicles in the automation area may be adapted, and by the present highly automated passage control system a vehicle may be relocated in automatic mode from one automation production area to another by combining the areas. In some embodiments, position information of autonomously operating mobile vehicles in the worksite is received. State parameter information of zones may be automatically updated on the basis of the position information. For example, a state parameter of the first zone or the second zone associated with the second passage control unit is updated in response to detecting the mobile object by the second passage control unit.

In some embodiments, at least some of the operational elements 21-27 are connected to a common network. For example, the PCUs 2 and the autonomously operating vehicles 3 are configured to connect a common network. The communication configuration of the elements may be thus set so as to allow connectivity after zone changes, e.g. the change of a PCU 2 to another location or merging of zones, without having to reconfigure connection settings.

In some embodiments, the merging of the zones may be demerged in response to detecting a mobile object by a border PCU of the fusion zone. A further method may thus be carried out by an apparatus, such as the controller 20, for controlling demerging of zones. Thus, a mobile object may be detected by the second PCU associated with the first zone of the fusion zone. In response to detecting the mobile object, position of autonomously operating mobile vehicle(s) in the fusion zone are checked. In response to at least one autonomously operating mobile vehicle being positioned in the second zone of the fusion zone, a control command to stop at least one autonomously operating mobile vehicle may be prevented. The first zone and the second zone are demerged. Thus, the fusion zone may be removed or amended by the demerging of the first zone and the second zone.

For example, with reference to the example FIG. 4d, in response to detecting the mobile object 5 by the PCU 2d, position of autonomously operating mobile vehicle(s) in the fusion zone may be checked. In response to detecting the autonomously operating mobile vehicle 3a being positioned in the other zone 4b, a control command to stop at least one autonomously operating mobile vehicle may be prevented. The zones 4b and 4d may be demerged. The state parameter of the zone 4c may be changed to indicating manual operation in response to the demerging. The classification parameter of the PCU 2c may be updated as a border PCU in response to merging of the zones 4b and 4c. Thus, if a mobile object is detected by the PCU 2c after the demerging, a control command is caused to stop the vehicle 3a in the zone 4b. If the fusion zone comprises further zones, such as the zone 4a, the fusion zone is maintained for such zones.

An electronic device comprising electronic circuitries may be an apparatus for realizing at least some embodiments of the present invention, such as the main operations illustrated in connection with FIGS. 3a and 3b. The apparatus may be comprised in at least one computing device connected to or integrated into a passage control system which may be part of a worksite control or automation system.

FIG. 6 illustrates an example apparatus capable of supporting at least some embodiments of the present invention. Illustrated is a device 60, which may comprise or implement the controller 20 illustrated above. The device may be configured to carry out at least some of the embodiments relating to the passage control system with dynamically adaptable zones.

Comprised in the device 60 is a processor 61, which may comprise, for example, a single- or multi-core processor. The processor 61 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 60 may comprise memory 62. The memory may comprise random-access memory and/or permanent memory. The memory may be at least in part accessible to the processor 61. The memory may be at least in part comprised in the processor 61. The memory may be at least in part external to the device 60 but accessible to the device. The memory 62 may be means for storing information, such as parameters 64 affecting operations of the device. The parameter information in particular may comprise zone state parameter information, PCU related configuration information and/or other passage control related information as appropriate for the passage control system and the designated role of the device in the system.

The memory 62 may comprise computer program code 63 including computer instructions that the processor 61 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions.

The device 60 may comprise a communications unit 65 comprising a transmitter and/or a receiver. The transmitter and the receiver may be configured to transmit and receive, respectively, information in accordance with at least one cellular or non-cellular standard. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, Ethernet and/or worldwide interoperability for microwave access, WiMAX, standards, for example. The device 60 may comprise a near-field communication, NFC, transceiver. The NFC transceiver may support at least one NFC technology, such as NFC, Bluetooth, or similar technologies.

The device 60 may comprise or be connected to a UI. The UI may comprise at least one of a display 66, a speaker, an input device 67 such as a keyboard, a joystick, a touchscreen, and/or a microphone. A user may operate the device and the rock processing machine via the UI, for example to change operation mode, change display views, modify parameters 64 in response to user authentication and adequate rights associated with the user, etc.

The device 60 may further comprise and/or be connected to further units, devices and systems, such as one or more sensors 68 sensing environment of the device 60. In particular, the device 60 and the processor 61 may be connected to operational and/or physical entities illustrated above e.g. in connection with FIG. 2.

The processor 61, the memory 62, the communications unit 65 and the UI may be interconnected by electrical leads internal to the device 60 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application at least in underground mining.

Acronyms List

ASIC Application-specific integrated circuit
FPGA Field-programmable gate array
GSM Global system for mobile communication
IoT Internet of things
LTE Long term evolution
NFC Near-field communication
N-RAT 3GPP new radio access technology
UI User interface
WCDMA Wideband code division multiple access WiMAX Worldwide interoperability for microwave access
WLAN Wireless local area network

The invention claimed is:

1. A method for a zone passage control system for an underground worksite having a plurality of operation zones for autonomously operating mobile vehicle operations, the method comprising:
   associating a first passage control unit with a first zone and a second zone of the underground worksite, the first passage control unit separating the first zone and the second zone;
   detecting state parameter information of the first zone and the second zone;
   merging the first zone and the second zone into a fusion zone on the basis of the state parameter information of the first zone and the second zone; and
   adapting the zone passage control system to allow a first autonomously operating mobile vehicle to pass the first passage control unit in the fusion zone without interrupting operation of a second autonomously operating mobile vehicle in the first zone and/or the second zone.

2. The method of claim 1, further comprising preventing a control command to stop the second autonomously operating mobile vehicle in the first zone and/or the second zone in response to the first autonomous mobile vehicle being detected by the first passage control unit set into the passive state.

3. The method of claim 1, wherein the first zone and the second zone are merged in response to the first zone and the second zone being assigned a state parameter indicating autonomous operation.

4. The method of claim 1, further comprising:
   assigning at least one passage control unit identifier for each zone in a passage control configuration data record in connection with configuration of one or more passage control units;
   comparing passage control unit identifiers of the first zone and the second zone; and
   in response to detecting a passage control unit identifier of the first passage control unit being assigned for the first zone and the second zone, the state parameter information of the first zone and the second zone are processed for determining if the first zone and the second zone will be merged.

5. The method of claim 4, wherein the passage control unit identifiers are compared in response to at least one of detecting the first autonomously operating mobile vehicle by the first passage control unit, in response to detecting a change of a state of the first zone, and in response to detecting a change of a state of the second zone.

6. The method of claim 1, further comprising:
   detecting a mobile object by a second passage control unit associated with a third zone and the first zone or the second zone; and
   causing a control command to stop at least one autonomously operating mobile vehicle in the first zone and/or the second zone in response to detecting the mobile object by the second passage control unit.

7. The method of claim 6, further comprising updating a state parameter of the first zone or the second zone associated with the second passage control unit in response to detecting the mobile object by the second passage control unit.

8. The method of claim 1, further comprising:
   assigning a classification parameter for each passage control unit, said classification parameter indicating a border passage control unit or as an intermediate passage control unit;
   checking the classification parameter of a passage control unit in response to detecting a mobile object by the passage control unit; and
   determining a need to cause a control command to at least one autonomously operating mobile vehicle in a zone associated with the passage control unit on the basis of the classification parameter of the passage control unit.

9. The method of claim 8, further comprising detecting a mobile object by a second passage control unit associated with a third zone and the first zone or the second zone, wherein the second passage control unit is before detecting the mobile object assigned with the border passage control unit classification parameter in response to the third zone being assigned a state parameter indicating manual operation.

10. The method of claim 8, further comprising updating a classification parameter of the first passage control unit as the intermediate passage control unit in response to the merging of the first zone and the second zone.

11. The method of claim 1, further comprising:
    detecting a state change of a fourth zone associated with a third passage control unit associated also with the first zone or the second zone;
    merging the fourth zone into the fusion zone in response to the fourth zone being assigned a state parameter indicating autonomous operation; and
    adapting the zone passage control system to allow an autonomously operating mobile vehicle to pass the third passage control unit in the fusion zone without interrupting operation of another autonomously operating mobile vehicle in the first zone, the second zone, and/or the fourth zone.

12. The method of claim 1, further comprising:
    receiving position information of autonomously operating mobile vehicles in the worksite; and
    updating state parameter information of zones automatically on the basis of the position information.

13. An apparatus for zone passage control in an underground worksite including a plurality of operation zones for autonomously operating mobile vehicle operations, the apparatus comprising at least one processor, at least one memory including computer program code, the at least one memory and the computer program code being configured to, with the at least one processing core, cause the apparatus at least to:
    associate a first passage control unit with a first zone and a second zone of the underground worksite, the first passage control unit separating the first zone and the second zone;
    detect state parameter information of the first zone and the second zone;
    merge the first zone and the second zone into a fusion zone on the basis of the state parameter information of the first zone and the second zone; and
    adapt the zone passage control to allow a first autonomously operating mobile vehicle to pass the first passage control unit in the fusion zone without interrupting operation of a second autonomously operating mobile vehicle in the first zone and/or the second zone.

14. The apparatus of claim 13, wherein the at least one memory and the computer program code are further configured to, with the at least one processor, cause the apparatus to prevent a control command to stop the second autonomously operating mobile vehicle in the first zone and/or the second zone in response to the first autonomous mobile vehicle being detected by the first passage control unit set into the passive state.

15. A non-transitory computer readable medium having a computer program comprising code for, when executed in a data processing apparatus, causes a method in accordance with claim 1 to be performed.

* * * * *